April 11, 1939.  A. KÉGRESSE  2,153,926
CONTROL VALVE FOR HYDRAULIC CHANGE-SPEED DEVICES
Filed May 27, 1937   2 Sheets-Sheet 1
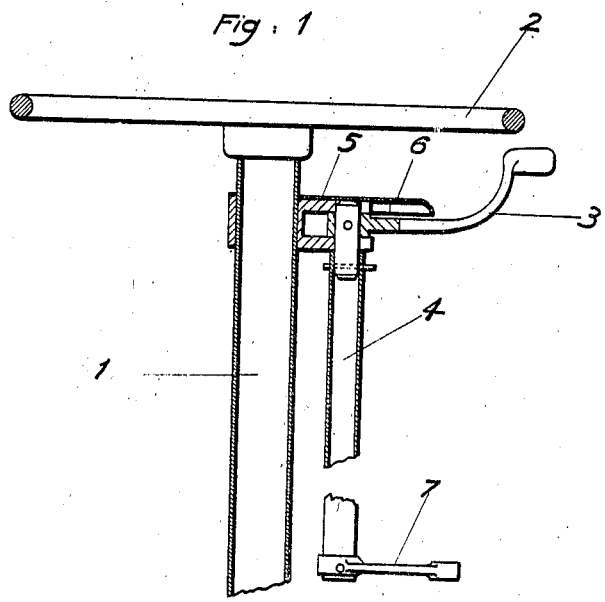
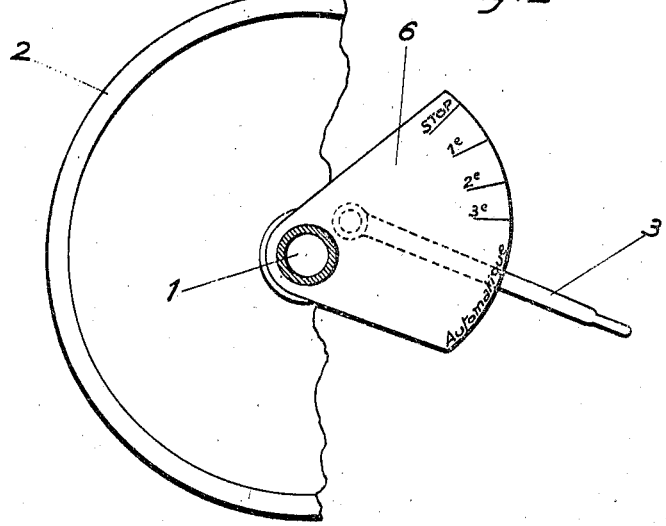
Inventor
A. KEGRESSE
By Young, Emery & Thompson
ATTYS.

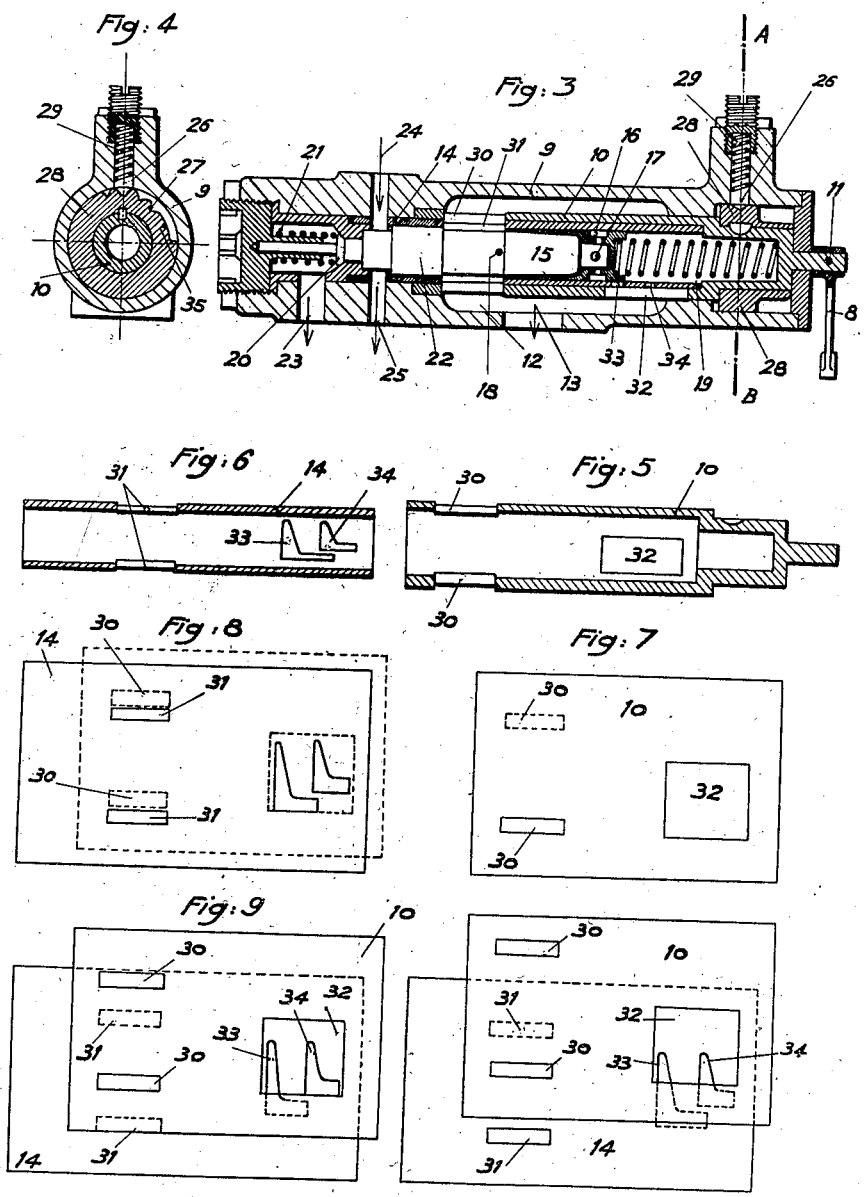

Patented Apr. 11, 1939

2,153,926

UNITED STATES PATENT OFFICE 2,153,926

CONTROL VALVE FOR HYDRAULIC CHANGE-SPEED DEVICES

Adolphe Kégresse, Paris, France

Application May 27, 1937, Serial No. 145,142
In France June 10, 1936

8 Claims. (Cl. 277—7)

This invention relates to pressure control valve apparatus for hydraulic change speed gears.

A hydraulic variable speed automatic transmission for automobiles and other uses must for practical purposes be not only automatic at any instant but also be capable of being subjected to the will of the driver, that is to say, that it must be possible by a single simple manipulation to preserve indefinitely any speed and this whatever may be the running speed of the motor. It is also necessary to be able to vary at any moment if desired the automaticity of the system and even to a certain extent to make this automaticity preselective.

The driver whether it be of an automobile, a motor cycle or any machine whatever, must therefore have within reach a handle or similar device permitting him to instantaneously obtain from his engine the work which he desires whether this be automatic or controlled.

The present invention relates more particularly to a pressure control valve apparatus for automatic variable speed transmissions as are used in automobiles. It can also be applied to all automatic transmissions, controlled or otherwise, of the same character, employed in industry.

The control valve apparatus described below constructed according to the invention responds to the above requirements. To attain the object, this apparatus controls automatically or by hand, the pressure and the delivery of the fluid employed as the hydraulic medium.

The apparatus is composed of two parts: a manual control device arranged within reach of the driver's hand and a pressure control valve operated by the former, and which may be carried out in various forms. The example here given constitutes a simple design of this apparatus.

In the annexed drawings:

Figure 1 is an elevation and partial section of the hand control device.

Figure 2 shows in plan, the same device.

Figure 3 shows in sectional elevation an example of the pressure control valve.

Figure 4 is a section on the line A—B of Figure 3.

Figure 5 shows in section a rotating sleeve valve in the mechanism of Fig. 3.

Figure 6 shows in section a fixed sleeve valve in the mechanism of Fig. 3.

Figure 7 represents the developed interior of the valve of Figure 5.

Figure 8 shows the developed exterior of the fixed sleeve valve of Figure 6, and, arranged in dotted lines on it, the valve of Figure 7, in the position of first speed.

Figure 9 represents developed the relative position of the valves of Figures 6 and 7 in the position of second speed.

Figure 10 is a corresponding view in third speed.

The hand control, represented by Figures 1 and 2, resembles certain controls used in automobiles. It is here shown fixed to the steering column 1 below the wheel 2. It could also be arranged at any other position provided that it is within convenient reach of the driver's hand.

This system of control comprises, as known, a handle 3 permanently fixed on a vertical shaft 4 (here tubular) capable of rotating in a collar 5 fixed on the steering column. The handle is covered by a fixed sector 6 carrying the operating indications. The extremity of the tubular shaft 4 opposite to the handle 3 has a small lever 7 connected by hinged link to the lever 8 of the pressure control valve.

The latter is composed of a body 9 in which is mounted with slight friction a rotating sleeve valve 10, shown separately in section by Figure 5, and the outer extremity of which carries a tail piece 11 carrying the control lever 8.

This rotating sleeve valve 10 forms, between its outer surface and the interior surface of the body 9, a chamber 12 communicating by a by-pass outlet 13 with a fluid reservoir, which may be the casing itself of the variable speed transmission.

This same rotating valve 10 furthermore receives internally a fixed sleeve valve 14 shown separately in section by Figure 6 and which is secured permanently in the body 9. In the interior of the fixed sleeve valve 14 moves a piston 15 of special form which comprises at one of its extremities a groove 16, communicating with the interior of the piston by a series of holes 17. The piston 15 is held in position of rest against a stop 18 by a helical spring 19.

On the end of the sleeve valve 14 opposite to the piston 15 there is arranged a valve 20 kept on its seat by a helical spring 21. This valve 20 can place the chamber 22, formed by the space existing inside the fixed sleeve valve 14, between the piston 15 and the valve 20, in communication with a discharge opening 23, communicating, like the orifice 13, with the fluid reservoir, which may be, as has been seen, the casing itself of the change speed gear.

The fluid enters the control valve casing through the inlet 24 and leaves through the discharge passage 25 which is connected to the hydraulic transmission.

A locking device 26, constituted by a spring finger or suitable spring-pressed plunger engages in notches 27 provided on a part 28 fast on the rotating sleeve valve 10, the first of which notches corresponds to the "stop" position, the others each to a speed position, and the smooth part 35 to automatic running. A spring 29 forces the locking plunger 26 into the notches 27.

The rotating sleeve valve 10 has ports 30 which cooperate with other ports of the same dimensions 31, provided on the fixed sleeve valve 14.

The rotating sleeve 10 has also a large rectangular opening 32 and the fixed sleeve 14 is provided with two openings 33 and 34 of special shape and arrangement.

The operation is as follows:

When the control handle 3 is at stop, the apparatus is regulated so that the rotating sleeve valve 10 has its openings 30 opposite openings 31 of the fixed sleeve valve, as shown by Figure 3. In this position the fluid under pressure, entering through the inlet 24, penetrates into the chamber 22, passes from there through the large ports 31 and 30 and then into the annular chamber 12, finally leaving through the by-pass outlet 13.

The ports 31 and 30 and the by-pass outlet 13 have such dimensions that they amply ensure the free discharge from the pump so that no efficient pressure is produced in the transmission connected to the delivery passage 25 and will therefore have no effect upon the members which it controls. The apparatus is in the "stop" position. The handle 3 will be kept in its position by the locking device 26 as clearly shown by Figure 4.

If now the handle 3 is brought on to the point marked 1° (1st speed) on the sector 6, the locking plunger 26 will drop into the first of the notches 27 and will hold the rotating sleeve valve 10 stationary with respect to the fixed sleeve valve 14, at the position shown developed by Figure 8, in which the sleeve 10 is represented dotted.

It will then be seen that the ports 30 of the rotating sleeve 10 no longer uncover the ports 31 of the fixed sleeve 14. On the other hand the large opening 32 of the sleeve 10 uncovers the ports 33 and 34 of the fixed sleeve 14. The latter are however closed by the movable piston 15. The fluid under pressure entering the chamber 22 through inlet 24 has no longer any possibility of outflow except at the delivery passage 25 which carries it to the members which it operates. These members being sufficiently tightly sealed, the pressure will rise to the point of displacing the piston 15, at the same time compressing the spring 19.

The channel 16 of the piston 15 will uncover the port 33 through which the fluid under pressure will escape into the chamber 12 and the by-pass outlet 13. The pressure will therefore be restricted and will not be able to exceed the value permitted by the tension of the spring 19, it being understood that the port 33 will have a sufficient area to take the output of the pump at the pressure thus obtained. This pressure which has been seen is directed through the delivery passage 25 towards the variable speed apparatus, will correspond to a first speed provided by this apparatus.

By bringing the handle 3 to the position marked "2°" (2nd speed) on the sector 6, the third notch 27 will be brought under the locking pin 26. The rotating sleeve 10 will then take up with respect to the fixed sleeve 14, the position shown developed on Figure 9. In this position the ports 30 move further away from the ports 31 and the large opening 32 of the rotating sleeve 10 will only uncover partially the port 33 of the fixed sleeve 14 but will still entirely uncover the port 34 of this same sleeve.

In this position and as in the previous case, the pressure will displace the piston 15 until the channel 16 of this piston uncovers the portion of port 33 which is exposed to port 32. But as the section uncovered of the port 33 is reduced it follows that the piston will only stop temporarily on this port since the output of the pump being greater than can be delivered by the part of the port 33 uncovered, the pressure will continue to rise, the spring 19 will be compressed more and the piston 15 continuing its movement will entirely close the port 33, to then uncover the port 34 of the fixed sleeve 14, the output of which will be sufficient to take the output of the pump.

As will be seen the pressure of the fluid will be higher in the chamber 22 at this position of the piston 15, and, consequently, in the conduit 25 than in the preceding position, and will thus permit of obtaining a second speed with the variable speed transmission apparatus.

By continuing to act on the handle 3 this is brought into the position marked "3°" (3rd speed), which position will correspond, for the rotating sleeve 10 and the fixed sleeve 14, to Figure 10 in which it will be noted that only the ports 33 and 34 remain uncovered to a somewhat small amount. Following the preceding reasoning it will be seen that the output of the uncovered part of each of the ports 33 and 34 being insufficient to take the complete output of the pump at a certain speed of the motor, the pressure will increase. The piston 15 will be held at the end of its stroke after having passed the uncovered part of the port 34. The fluid will no longer have any possible outflow, its pressure will rise rapidly until the valve 20 (Fig. 3) held hitherto on its seat by the spiral spring 21, opens in its turn to allow the passage, through the orifice 23 of the excess output. Naturally the spring 21 is so adjusted that it will only come into operation after the piston 15 has reached the end of its stroke. At this instant there is attained the maximum pressure arranged for the apparatus, which maximum corresponds in the variable transmission apparatus to the greatest speed.

By continuing to act on the handle 3 and carrying it away from the point marked 3° (3rd speed) it may be brought into any position in the range of the sector 6 marked "automatic". A position of the handle 3 in this range will bring the rotating sleeve 10 into a position intermediate between the position of Figure 10 and that in which the apertures 33 and 34 would be entirely closed.

It will be understood that according to the value or amount of the section uncovered of the ports 33 and 34 the pressure of the fluid will remain for a greater or shorter time at the amounts permitted by the delivery of the fluid through these sections. Each pressure resulting from the delivery through the ports 33 and 34 will give a perfectly definite speed in such manner that the variable speed transmission will operate for a longer or shorter time on one of these speeds, according to the amount of the delivery through the sections 33 and 34.

It will be noted that for application for example to an automobile, and for driving on ordinary routes, it will not be necessary in practical working to stop on the points 1, 2, 3, but it will be possible to pass directly from the point "Stop" to Automatic running. The pressure resulting in the various speeds will be obtained automatically by the time the channel of the piston 15 remains opposite the uncovered part of the ports 33 and 34.

The greater the section of this part uncovered, the longer the time of operation on each speed will be.

It will also be noted that, whatever may be the position of the handle 3, the working wil always be automatic, that is to say, that if the handle is placed for example, on the 2nd speed it will not be possible to exceed this, but the operation of the machine, from the Stop to this 2nd speed will none the less be automatic, that is to say that, as soon as the speed of the motor drops below a certain rate no longer ensuring a sufficient delivery of fluid, the pressure will fall. The spring 19 then expanding will bring the channel 16 of the piston 15 opposite the port 33 which regulates the first speed.

If the speed of the motor still drops, the pressure will fall still more until it becomes insufficient to ensure the working, even at the first speed. The machine will then stop.

If instead of decreasing, the speed of the motor increases, the handle 3 being still at the position "2nd", the output of the pump will also increase and will cause the pressure to again rise, which, passing through the 1st speed (the uncovered part of the orifice 33 of which will become insufficient) will attain the value corresponding to the second speed, which it will not be able to exceed as long as the position of the handle 3 will remain on the figure "2nd".

It will be the same for the positions of the handle on the 1st and the 3rd speed.

If the handle is placed at "Automatic" and it is desired to pass for example to the second speed, it will be sufficient to bring the handle to the figure "2nd". The sleeve valve 10 will then take up the position of Figure 9. The channel 16 of the piston 15 will then be opposite the centre part of the port 34 which will have for effect to cause the pressure to instantly drop and bring it to the equivalent of running at the second speed.

If now the handle 3 being placed at the bottom on "Automatic" and that, in consequence of an obligatory slowing down provided for in anticipation, it is desired to again start, after this slowing down, in a more rapid manner, it will be sufficient to move the handle on to the figure "2nd" (or the figure "1st" according to circumstances). During the slowing down the pressure will fall and will be stabilized, if the speed of the motor is sufficient, at the value controlled by one of the orifices 22 or 34 whether the handle be on "1st" or on "2nd"; as soon as the increased speed is effected, the pressure will no longer be able to attain more than the amount provided for by the position of the handle.

There is thus attained a pre-selectivity in the operation.

As will be seen the invention properly responds to the object stated in the introduction, that is, that by the simple manipulation of a handle it is possible to obtain either the stopping, or some one of the speeds, or automatic operation with variable automaticity at the will of the driver, or again pre-selectivity.

Naturally the apparatus may be constructed for any number of speeds.

I claim:

1. A pressure control valve for hydraulic change speed gears, comprising a casing having an inlet, a delivery passage to the change speed gear, and a by-pass outlet for the hydraulic medium; a ported sleeve valve in said casing controlling the by-pass outlet, said sleeve being rotatable manually to a plurality of operating positions; a fixed ported sleeve valve cooperating with the ports of the rotatable sleeve valve; and a ported piston slidable relatively to the sleeve valves and movable by the pressure medium to connect said inlet to ports of the sleeve valves communicating with said by-pass outlet and presenting passages of different area to the flow through the by-pass outlet according to the position of the rotatable sleeve.

2. A pressure control valve according to claim 1, in which the fixed sleeve valve is arranged concentrically inside the rotatable sleeve valve and the piston is slidable inside the fixed sleeve valve.

3. A pressure control valve for hydraulic change speed gears, comprising a casing having an inlet, a delivery passage to the change speed gear, and a by-pass outlet for the hydraulic medium; a ported sleeve valve in said casing controlling the by-pass outlet, said sleeve being rotatable manually to a plurality of operating positions; a fixed ported sleeve valve cooperating with the ports of the rotatable sleeve valve; a ported piston slidable relatively to the sleeve valves and movable by the pressure medium to connect said inlet to ports of the sleeve valves communicating with said by-pass outlet and presenting passages of different area to the flow through the by-pass outlet according to the position of the rotatable sleeve; and a spring-opposing movement of the piston by the pressure medium.

4. A pressure control valve for hydraulic change speed gears, comprising a casing having an inlet, a delivery passage to the change speed gear, and a by-pass outlet for the hydraulic medium; a ported sleeve valve in said casing controlling the by-pass outlet, said sleeve being rotatable manually to a plurality of operating positions; a fixed ported sleeve valve cooperating with the ports of the rotatable sleeve valve; a ported piston slidable relatively to the sleeve valves and movable by the pressure medium to connect said inlet to ports of the sleeve valves communicating with said by-pass outlet and presenting passages of different area to the flow through the by-pass outlet according to the position of the rotatable sleeve; and a valve in said casing normally preventing flow of the medium from the inlet to an auxiliary outlet opening in said casing, said valve being spring loaded to open at a determined pressure.

5. A pressure control valve for hydraulic change speed gears, comprising a casing having an inlet, a delivery passage to the change speed gear, and a by-pass outlet for the hydraulic medium; a ported sleeve valve in said casing controlling the by-pass outlet, said sleeve being rotatable manually to a plurality of operating positions; a fixed ported sleeve valve cooperating with the ports of the rotatable sleeve valve; a ported piston slidable relatively to the sleeve valves and movable by the pressure medium to connect said inlet to ports of the sleeve valves communicating with said by-pass outlet and presenting passages of different area to the flow through the by-pass outlet according to the position of the rotatable sleeve; and means for resiliently holding the manually rotatable sleeve valve in each of its operating positions.

6. A pressure control valve for hydraulic change speed gears, comprising a casing having an inlet, a delivery passage to the change speed gear, and a by-pass outlet for the hydraulic medium; a ported sleeve valve in said casing controlling the by-pass outlet, said sleeve being rotatable manually to a plurality of operating positions; a fixed ported sleeve valve cooperating with the ports of the rotatable sleeve valve; and a ported piston slidable relatively to the sleeve valves and movable by the pressure medium to connect said inlet to ports of the sleeve valves communicating with said by-pass outlet and presenting passages of different area to the flow through the by-pass outlet according to the position of the rotatable sleeve, the working positions of the rotatable sleeve valve including a stop position in which the by-pass outlet is fully open and a plurality of speed positions in which the by-pass outlet is progressively reduced in area.

7. A pressure control valve according to claim 6, in combination with a sector having indicia corresponding to the working positions of the rotatable sleeve valve and a member manually settable with the aid of said indicia, said member being connected to the rotatable sleeve valve.

8. A pressure control valve according to claim 6, in which the rotatable sleeve valve has a range of movements determining still further reduction of by-pass area beyond the highest speed position, said range of movement being subject to automatic control.

ADOLPHE KÉGRESSE.